Dec. 11, 1956    J. C. REID ET AL    2,773,838
PRODUCTION OF MALEIC AND ALKYL SUBSTITUTED
MALEIC ANHYDRIDES BY CATALYTIC OXIDATION
Filed May 1, 1951
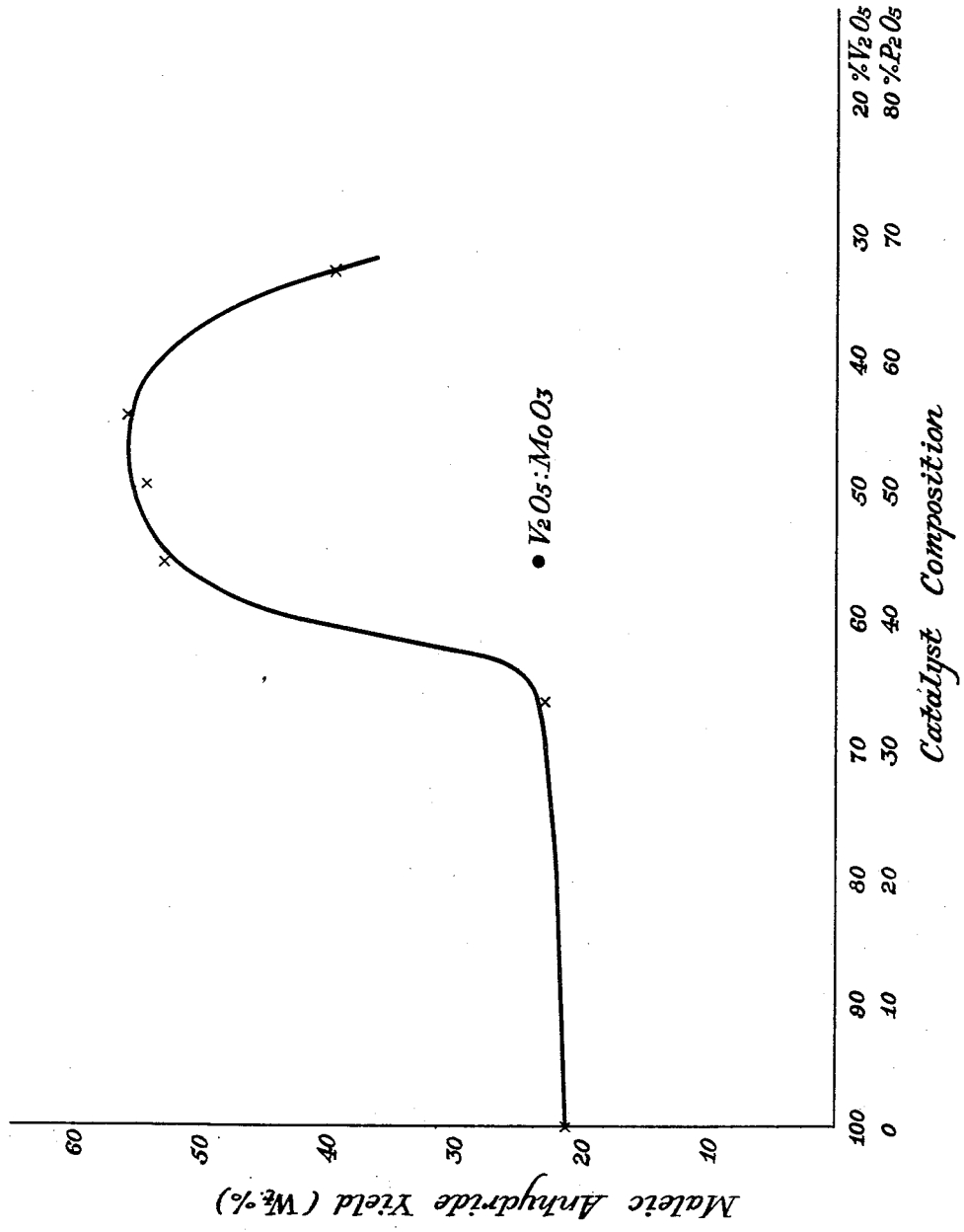
ATTEST
Fred C Philpitt
INVENTOR.
JOHN C. REID
NORMAN C. SIDEBOTHAM
BY
Norbert E Birch

Patent content

2,773,838

PRODUCTION OF MALEIC AND ALKYL SUBSTITUTED MALEIC ANHYDRIDES BY CATALYTIC OXIDATION

John C. Reid, Wynnewood, and Norman C. Sidebotham, Drexel Hill, Pa., assignors to The Atlantic Refining Company, Philadelphia, Pa., a corporation of Pennsylvania Application May 1, 1951, Serial No. 224,004

2 Claims. (Cl. 252—437)

This invention relates to an improved process for the manufacture of dicarboxylic acid anhydrides. It relates more particularly to an improved process for producing maleic and citraconic anhydrides by reacting a mixture of hydrocarbon and air in the presence of a new and novel catalyst.

It is well known that dicarboxylic acid anhydrides can be produced by the catalytic oxidation of various hydrocarbons. Broadly, these known processes comprise reacting a mixture of a hydrocarbon vapor and an oxygen-containing gas in the presence of a heated catalyst. Among the catalysts which have been proposed for this process are the oxides and salts of vanadium, molybdenum, bismuth, uranium, tungsten, and manganese, as well as the oxides and salts of other metallic elements of the fifth and sixth groups of the periodic system. Although the prior art catalysts may have their individual merits, it has been found, as a general rule, that successful operation with these catalysts is primarily limited to the catalytic oxidation of aromatic hydrocarbons such as benzene, toluene, diphenyl, etc. As far as the oxidation of olefinic hydrocarbons is concerned, it has been found that these prior art catalysts give very poor yields of anhydrides.

The deficiencies and limited applicability of the prior art catalysts have now assumed particular importance for the reason that many of the aromatic hydrocarbons, such as benzene, toluene, etc., which have heretofore been employed as charge stocks in the production of dicarboxylic acid anhydrides, have become increasingly expensive and difficult to obtain in commercially required quantities. As a result, it has become necessary for industry to look toward other types of hydrocarbons which will serve as a suitable charge stock for the production of these anhydrides. There is an abundant supply of olefinic hydrocarbons available from various petroleum sources and process streams, such as cracked naphtha (usually containing more than 60% olefins), pressure distillate, etc. There are large quantities of butenes and other olefins having at least 4 carbon atoms per molecule available from various cracking processes which would form a particularly suitable charge stock if a catalyst could be found which would produce high yields of anhydrides from these materials.

It is, therefore, a primary object of this invention to produce high yields of dicarboxylic acid anhydrides from olefinic hydrocarbons by means of a new and novel catalyst.

It has been discovered according to this invention, that this object may be accomplished with a particular oxygen-vanadium-phosphorus catalyst composition. It has been found, quite unexpectedly, that when an olefinic hydrocarbon and air are contacted with this novel oxygen-vanadium-phosphorus catalyst, characterized by certain critical proportions, under controlled conditions of temperature, contact time, and space velocity, it is possible to produce excellent yields of high purity dicarboxylic acid anhydrides. It has been further found that when a catalyst of the critical proportions is employed, it has a longer life under actual operating conditions and is, in addition, superior insofar as the regulation and control of the reaction is concerned.

More particularly, it has been found that a catalyst comprising oxygen, vanadium and phosphorus in chemical combination corresponding to a weight ratio of $V_2O_5$ to $P_2O_5$ within the range of 3:2 and 1:2 produces markedly superior yields of anhydrides from olefinic hydrocarbon charge stocks. Although a catalyst corresponding to this range of weight ratios produces results which are vastly superior to any catalyst known heretofore in the art, best results are attained with a catalyst composition wherein the above mentioned weight ratio of $V_2O_5$ to $P_2O_5$ is 4:5. Although these various catalysts are reported on the basis of $V_2O_5:P_2O_5$ weight ratios, it is probable that various complexes exist such as phosphovanadates, vanadophosphates, and the like. There is even a possibility that some complexes with ammonia may exist when ammonium meta-vanadate or other ammonium compounds are used in the preparation of the catalyst, but at the elevated temperatures employed in this reaction, the presence of ammonium salts is rather doubtful. It is also possible that small amounts of the phosphorus may be present as uncombined metaphosphoric acid, $HPO_3$, at the lower reaction temperatures. The exact chemical composition and molecular structure of these catalysts is, therefore, not known with absolute certainty, however, it is known that regardless of the exact form of the chemical combination, for all practical purposes, the catalyst may be accurately expressed and defined on the basis of a mixture of the oxides—$V_2O_5$ and $P_2O_5$.

Since this invention primarily resides in the discovery of a novel catalyst composition rather than in any particular process for producing this catalyst, only a few exemplary methods of preparing this catalyst composition are given below. No attempt has been made to recite all of the possible ways in which such a catalyst could be produced since those familiar with the art of catalyst manufacture could, in all probability, readily devise many other equally successful methods for preparing such a catalyst from their knowledge of the preparation of similar or dissimilar catalyst compositions disclosed in the patent literature and other technical publications.

The preferred method of producing the catalyst involves the addition of a desired quantity of ammonium meta-vanadate to a warm aqueous phosphoric acid solution. Upon complete solution of the meta-vanadate, a carrier may be added if desired. The supernatant liquid is removed by evaporation and the remaining material dried in an oven at a temperature ranging between 200° F. and 400° F. The resulting solids are ground to the desired size and heated at a temperature ranging between 700° F. and 1100° F. in an air stream for several hours prior to use. A specific method of producing such a catalyst according to the above method is as follows:

EXAMPLE I 1444 grams of 85% $H_3PO_4$ was mixed with 2800 cc. of distilled water and cooled to room temperature. 915.2 grams of $NH_4VO_3$ was then added and dissolved. This solution was heated and after precipitation occurred, the supernatant liquid was removed by evaporation, the remaining solids were oven dried for 4 hours at 400° F., following which the dried solids were ground to pass 35 mesh. The ground solids were then pelleted and the pellets were calcined in an air stream in a muffle furnace as follows: one-half hour at 700° F., one-half hour at 800° F., and a final six hours at 900° F.

If an inert carrier such as tabular alumina (alpha alumina) is to be included in the catalyst, it is preferably added to the solution before precipitation is effected. The solution containing the carrier is then evaporated, dried, and calcined as outlined above. Modifications of this procedure such as multiple impregnation of the inert carrier by the incremental addition of aliquot portions of the solution may also be employed. It is also possible that the carrier material may be physically admixed and pelleted with the oven dried vanadium-phosphorus-oxygen composite.

If the catalyst is to be used in a fluidized reaction zone, the ground catalyst is calcined in a fluidized bed instead of pelleting and calcining in a furnace.

This catalyst may be employed in either a fixed or fluidized reaction zone. A fluidized reaction zone has the advantages of closer temperature control as well as more intimate contact between the catalyst and reactants. However, in some instances, fluidized operation may be undesirable in that the catalyst particles are subject to considerable attrition, which may eventually result in a loss of active material in the form of fines after prolonged periods of use.

As has been set forth above, the vanadium-phosphorus-oxygen catalyst may be deposited on an inert carrier. The weight percent of active catalyst on the carrier may be suitably varied between 5% and 100%. For fixed bed operation, it has been found that higher yields are obtained without a carrier while in fluidized operation, a carrier is usually desirable. Among the carriers which can be employed are tabular alumina (alpha alumina), boron phosphate, carborundum, alundum, fuller's earth, pumice, asbestos, kieselguhr, or the like. As a general rule, any carrier which exhibits little or no hydrocarbon catalytic cracking activity may be used.

This invention will be further explained by reference to the following specific example which is given for illustrative purposes only, and is not intended to limit the procedure to the details given, since the operating conditions may be varied within wide limits without departing from the spirit or scope of the invention.

EXAMPLE II

A mixture of approximately 75 volumes of air to one volume of a hydrocarbon (comprising 85% butene-2 and 15% butane) was passed over a fixed bed of a vanadium-phosphorus-oxygen catalyst which was prepared according to the procedure set forth in Example I, and whose proportions corresponded to a 4:5 weight ratio of $V_2O_5$ to $P_2O_5$. The vanadium-phosphorus-oxygen catalyst was supported on tabular alumina, and comprised 24% by weight of the total mass. The space velocity was 0.14 gram of feed per hour per gram of active catalyst material, and the gas velocity was 1.08 feet per second. The temperature was maintained at 900° F. and the contact time was 1.1 seconds. The yield of maleic anhydride was 55.9 weight percent of the hydrocarbon charged.

In another run, the catalyst of Example I was used in the absence of a carrier under similar operating conditions, and yields of approximately 70% were obtained.

Small amounts of citraconic anhydride may be present in the reaction product in addition to maleic anhydride if the hydrocarbons charged contain more than 4 carbon atoms per molecule.

The conditions of the process may be varied considerably from those described in the above example. Thus, instead of butene-2, other olefinic hydrocarbons such as butadiene, cracked naphthas, and heavier olefins could be used to produce the desired dicarboxylic acid anhydrides. Even though the greatest value and most unexpected advantage of the catalyst of the instant invention resides primarily in its ability to convert olefinic hydrocarbons into dicarboxylic acid anhydrides, high yields are also obtained from feed stocks containing aromatic hydrocarbons such as benzene, toluene, etc., although the increase in yield obtained by the instant catalyst compared with prior art catalysts is not as marked when using aromatic hydrocarbons as it is with olefinic hydrocarbons.

The ratio of hydrocarbon to air employed may be varied within wide limits; for example, between 10 and 200 volumes of air per volume of hydrocarbon may be used, however, ranges between 35:1 and 100:1 are preferred. The choice of the particular ratio to be used is largely dependent upon the particular apparatus, charge stock, and temperature employed, but in all cases, the ratio should be sufficiently low on the one hand to utilize reactors within practical size limits and to permit feasible recovery of the desired end product, while, on the other hand, the ratio should be sufficiently high to avoid excessive amounts of unreacted hydrocarbons in the product. Oxygen, ozone, or other free oxygen-containing gases may be employed instead of air.

The reaction temperature may be varied between 600° F. and 1100° F., although temperatures of 800° F. to 1000° F. are preferred. The contact time may vary between 0.5 and 5.0 seconds, preferably between 0.6 and 2.0. The temperature and contact time are, for the most part, inter-related, a higher temperature usually being employed with a shorter contact time and vice versa. The space velocity may be varied over a relatively wide range, however, 0.04 to 4.0 grams of hydrocarbon per gram of active catalyst per hour is the preferred range. Atmospheric, sub-atmospheric, or superatmospheric pressures may be employed with equal success. Furthermore, some latitude in selecting the exact catalyst composition (within the critical range set forth earlier) is possible, which, in turn, may necessitate variation or adjustment of the other operating conditions enumerated above in order to utilize the catalyst to its greatest advantage in the production of maximum yields of anhydrides.

The dicarboxylic acid anhydrides can be recovered in a number of ways well known in the art, for instance, by condensation or absorption in a suitable medium.

Table I below gives some comparative results on the catalytic oxidation of a high olefin-content hydrocarbon 85% butene-2 and 15% butane) to maleic anhydride with the instant novel catalyst and with vanadium-molybdenum catalysts of the type utilized heretofore in the prior art. These data show the marked superiority of the instant catalyst in such a process, the yields of maleic anhydride being nearly 100% greater.

Table I

| Charge Stock | 85% Butene-2 15% Butane 17.2% 5:4 $V_2O_5$: $MoO_3$ and 82.8% tabular alumina | 85% Butene-2 15% Butane 24% 4:5 $V_2O_5$: $P_2O_5$ and 76% tabular alumina |
| Catalyst | | |
| --- | --- | --- |
| Temperature (° F.) | 700 | 900 |
| Air/Hydrocarbon Ratio (vol.) | 74 | 75 |
| Space velocity (gms. feed/hr./gm. of active catalytic material) | .21 | .14 |
| Gas Velocity (feet per second) | .87 | 1.08 |
| Contact Time (seconds) | 1.1 | 1.1 |
| Yield of Maleic Anhydride (Wt. percent based on charge) | 23.2 | 55.9 |

Table II below and the curve in the drawing are presented to further demonstrate that there is, in fact, a critical range of $V_2O_5$ to $P_2O_5$ weight ratios (heretofore mentioned) which must be maintained in order to obtain high yields of anhydrides from feed stocks containing a substantial proportion of olefinic hydrocarbons.

Table II

EFFECT OF CATALYST COMPOSITION ON YIELD OF MALEIC ANHYDRIDE FROM BUTENE-2 FEED

| Catalyst Composition | Percent Active[1] Catalyst | Temp. (° F.) | Air/H. C. Ratio | Sp. Vel. (g./g./hr.) | Gas Vel. (ft./sec.) | Time (sec.) | Yield of Maleic Anhydride (wt. percent) |
|---|---|---|---|---|---|---|---|
| $V_2O_5$ | 9.1 | 650 | 73 | 0.38 | 0.88 | 1.3 | 14.1 |
|  | 9.1 | 710 | 73 | 0.38 | 0.92 | 1.3 | 21.2 |
|  | 9.1 | 755 | 73 | 0.38 | 0.95 | 1.2 | 14.4 |
| $6V_2O_5:3P_2O_5$ | 9.1 | 804 | 75 | 0.46 | 0.95 | 1.2 | 23.0 |
|  | 9.1 | 850 | 75 | 0.46 | 0.98 | 1.2 | 21.6 |
| $5V_2O_5:4P_2O_5$ | 9.1 | 950 | 77 | 0.51 | 1.08 | 1.1 | 53.0 |
|  | 9.1 | 999 | 77 | 0.51 | 1.11 | 1.1 | 53.0 |
| $4.5V_2O_5:4.5P_2O_5$ | 9.1 | 950 | 75 | 0.51 | 1.06 | 1.1 | 54.5 |
|  | 9.1 | 1,002 | 75 | 0.51 | 1.10 | 1.1 | 54.5 |
| $4V_2O_5:5P_2O_5$ | 9.1 | 952 | 77 | 0.50 | 1.07 | 1.1 | 55.8 |
| $3V_2O_5:6P_2O_5$ | 9.1 | 1,052 | 77 | 0.50 | 1.14 | 1.0 | 39.7 |
| $5V_2O_5:4MoO_3$ | 9.1 | 710 | 73 | 0.38 | 0.90 | 1.3 | 23.6 |

[1] Supported on tabular alumina.

The curve in the drawing and Table II clearly show that this range encompasses $V_2O_5$ to $P_2O_5$ weight ratios between 3:2 and 1:2, although a $V_2O_5$ to $P_2O_5$ weight ratio of about 4:5 is preferred. Although it has been suggested in the prior art that phosphorus compounds may be incorporated in an oxidation catalyst, it has also been explicitly stated that the amount of phosphorus should be limited to an exceedingly small percentage of the active catalyst, preferably less than 1½%, and certainly less than 20%. As can readily be seen from the data in Table II and the curve in the drawing, catalysts containing less than 35% of $P_2O_5$ are manifestly incapable of producing high yields of maleic anhydride. Only when the weight ratio of $V_2O_5$ and $P_2O_5$ is maintained within the critical range between 3:2 and 1:2 (approximately 40%–65% $P_2O_5$) can high yields of maleic anhydride be obtained.

We claim:

1. A method of producing dicarboxylic acid anhydrides selected from the group consisting of maleic anhydride or alkyl substituted maleic anhydrides which comprises reacting the vapor of a non-aromatic, unsaturated hydrocarbon containing at least 4 carbon atoms with a free oxygen-containing gas at a temperature ranging between 800° F. to 1000° F. in the presence of a catalyst prepared by reacting ammonium meta-vanadate with phosphoric acid in an aqueous solution in the presence of an inert carrier followed by removal of the supernatant liquid by evaporation, drying the calcining, wherein oxygen, vanadium, and phosphorus are present in a proportion corresponding to a weight ratio of $V_2O_5$ to $P_2O_5$ within the range of 3:2 and 1:2.

2. A catalyst for the vapor phase partial oxidation of non-aromatic, unsaturated hydrocarbons prepared by reacting ammonium meta-vanadate with phosphoric acid in an aqueous solution in the presence of an inert carrier followed by removal of the supernatant liquid by evaporation, drying, and calcining, wherein oxygen, vanadium, and phosphorus are present in a proportion corresponding to a weight ratio of $V_2O_5$ to $P_2O_5$ within the range of 3:2 and 1:2.

References Cited in the file of this patent

UNITED STATES PATENTS

| | | |
|---|---|---|
| 1,636,857 | Craver | July 26, 1927 |
| 1,895,522 | Punnett | Jan. 31, 1933 |
| 2,114,798 | Foster | Apr. 19, 1938 |
| 2,142,678 | Porter | Jan. 3, 1939 |
| 2,215,070 | Miller | Sept. 17, 1940 |
| 2,294,130 | Porter | Aug. 25, 1942 |
| 2,340,739 | Downs | Feb. 1, 1944 |
| 2,415,531 | Porter | Feb. 11, 1947 |
| 2,425,096 | Ipatieff | Aug. 5, 1947 |
| 2,464,825 | Nielsen | Mar. 22, 1949 |

FOREIGN PATENTS

| | | |
|---|---|---|
| 408,026 | Canada | Oct. 13, 1942 |